United States Patent
Polk, Jr. et al.

(10) Patent No.: US 11,285,400 B2
(45) Date of Patent: Mar. 29, 2022

(54) MULTI-EFFECT SOLAR DISTILLATION SYSTEM AND ASSOCIATED METHODS

(71) Applicant: D AND D MANUFACTURING, Titusville, FL (US)

(72) Inventors: Dale E. Polk, Jr., Titusville, FL (US); Timothy A. Polk, Titusville, FL (US)

(73) Assignee: D AND D MANUFACTURING, Titusville, FL (US)

( * ) Notice: Subject to any disclaimer, the term of this patent is extended or adjusted under 35 U.S.C. 154(b) by 682 days.

(21) Appl. No.: 14/714,709

(22) Filed: May 18, 2015

(65) Prior Publication Data
US 2015/0329378 A1 Nov. 19, 2015

Related U.S. Application Data

(60) Provisional application No. 62/000,209, filed on May 19, 2014.

(51) Int. Cl.
*C02F 1/14* (2006.01)
*B01D 3/14* (2006.01)
(Continued)

(52) U.S. Cl.
CPC ........... *B01D 3/10* (2013.01); *B01D 1/26* (2013.01); *B01D 3/146* (2013.01); *C02F 1/048* (2013.01);
(Continued)

(58) Field of Classification Search
None
See application file for complete search history.

(56) References Cited

U.S. PATENT DOCUMENTS 4,053,368 A * 10/1977 Courvoisier ............. B01D 1/26
202/233
4,227,970 A * 10/1980 Howell, Jr. ............... C02F 1/14
202/234
(Continued)

FOREIGN PATENT DOCUMENTS

CN 102844274 B * 11/2014 ........... B01D 1/0035
DE 8424789 7/1986
(Continued)

OTHER PUBLICATIONS

Tham, "Distillation, an introduction," 2006, accessed on the Internet at https://aussiedistiller.com.au/books/Chocaholic/Introduction%20to%20Distillation.pdf on Jul. 8, 2018, 39 pages. (Year: 2006).*
(Continued)

*Primary Examiner* — Bobby Ramdhanie
*Assistant Examiner* — Denise R. Anderson
(74) *Attorney, Agent, or Firm* — Allen, Dyer, Doppelt + Gilchrist, PA

(57) ABSTRACT

A solar distillation system includes solar panels, and receivers adjacent the solar panels to receive process water to be processed to purified process water. The process water flows from a first receiver to a last receiver and is heated by reflected sunlight. Vapor tubes are coupled to the receivers, with each respective vapor tube coupled between adjacent receivers. Water vapor is generated as the process water is heated within each receiver. The water vapor flows via the respective vapor tubes between the adjacent receivers towards the last receiver. A return vapor tube is coupled to the last receiver. A distillation tube is coupled to the return vapor tube to receive the water vapor. The distillation tube extends through the receivers from the last receiver to the first receiver. As the water vapor travels through the distil-
(Continued)

lation tube it changes to a liquid, with the liquid being the purified process water.

14 Claims, 9 Drawing Sheets

(51) Int. Cl.
| | | |
|---|---|---|
| *B01D 3/10* | (2006.01) | |
| *C02F 1/04* | (2006.01) | |
| *C02F 1/06* | (2006.01) | |
| *B01D 1/26* | (2006.01) | |
| *C02F 103/08* | (2006.01) | |
| *C02F 103/10* | (2006.01) | |

(52) U.S. Cl.
CPC ................. *C02F 1/06* (2013.01); *C02F 1/14* (2013.01); *C02F 2103/08* (2013.01); *C02F 2103/10* (2013.01); *C02F 2301/063* (2013.01); *Y02A 20/212* (2018.01); *Y02W 10/37* (2015.05)

(56) References Cited

U.S. PATENT DOCUMENTS

| | | | | |
|---|---|---|---|---|
| 4,235,679 A * | 11/1980 | Swaidan | ............... | B01D 5/0066 |
| | | | | 202/176 |
| 4,318,781 A * | 3/1982 | Iida | ........................... | C02F 1/14 |
| | | | | 126/635 |
| 4,329,204 A | 5/1982 | Petrek et al. | | |
| 4,343,683 A | 8/1982 | Diggs | | |
| 4,504,362 A | 3/1985 | Kruse | | |
| 4,680,090 A | 7/1987 | Lew | | |
| 6,342,127 B1 * | 1/2002 | Possidento | ........... | B01D 5/0066 |
| | | | | 159/903 |
| 6,821,395 B1 * | 11/2004 | Ward | ........................ | C02F 1/14 |
| | | | | 159/903 |
| 8,580,085 B2 | 11/2013 | Kemp | | |
| 8,613,839 B2 | 12/2013 | Maisotsenko et al. | | |
| 8,613,840 B1 | 12/2013 | Alayoub | | |
| 10,703,644 B2 * | 7/2020 | Younes | ..................... | C02F 1/06 |
| 2003/0150704 A1 * | 8/2003 | Posada | ..................... | B01D 1/04 |
| | | | | 203/1 |
| 2007/0193870 A1 | 8/2007 | Prueitt | | |
| 2011/0048921 A1 | 3/2011 | Cap et al. | | |
| 2012/0318658 A1 * | 12/2012 | Hong | ................... | B01D 1/0035 |
| | | | | 203/10 |
| 2014/0042009 A1 | 2/2014 | Huang et al. | | |

FOREIGN PATENT DOCUMENTS

| | | |
|---|---|---|
| DE | 102009018041 | 10/2010 |
| GB | 1467472 | 3/1977 |
| GB | 2469321 | 10/2010 |
| JP | 52-142673 | 11/1977 |
| JP | 56-147679 | 11/1981 |
| WO | 2006/077593 | 7/2006 |
| WO | 2009/065407 | 5/2009 |

OTHER PUBLICATIONS

Hamed et al., "Prospects of Improving Energy Consumption of the Multi-Stage Flash Distillation Process," Saline Water Conversion Corporation Proceedings of the Fourth Annual Workshop on Water Conservation in the Kingdom, Dhahran, Apr. 23-25, 2001, from IDS dated Jul. 7, 2018, 14 pages. (Year: 2001).*
"About Aqua4 Technology" WaterfX: http://waterfx.co/aqua4; retrieved from internet May 18, 2015, 2 pgs.
WaterfX: http://waterfx.co; retrieved from internet May 18, 2015, 1 pg.
Hamed, et al, "Prospects of Improving Energy Consumption of the Multi-Stage Flash Distillation Process" Saline Water Conversion Corporation Proceedings of the Fourth Annual Workshop on Water Conservation in the Kingdom, Dhahran, Apr. 23-25, 2001; pp. 14.

\* cited by examiner

MULTI-EFFECT SOLAR DISTILLATION SYSTEM AND ASSOCIATED METHODS

RELATED APPLICATION

This application claims the benefit of U.S. Provisional Application Ser. No. 62/000,209 filed May 19, 2014, the entire contents of which are incorporated herein by reference.

FIELD OF THE INVENTION

The present invention relates to the field of water treatment, and, more particularly, to the distillation of water using solar power.

BACKGROUND OF THE INVENTION

Fresh water is a critical need in many parts of the world. Other contaminated water or liquid, such as oil field frac water and industrial waste water, also needs to be processed before being disposed. A number of different methods have been developed for processing seawater or other contaminated water that is not portable to provide fresh water.

One approach is to use settling and filtration systems to remove relatively large impurities from the seawater or contaminated water. Filtration is also capable of removing smaller contaminants down to the size of bacteria, and perhaps even smaller particulates in certain cases. However, filtration systems capable of removing contaminants down to ionic size are quite costly, both in terms of manufacture and in maintenance as well.

An alternative method of water purification is distillation. Distillation works well in the removal of virtually all impurities from water. Distillation is used in many areas for the desalination of seawater. However, most distillation processes require considerable heat to produce sufficient evaporation since the water is heated to boiling to accelerate the evaporation process. This is particularly true of large-scale distilling operations.

Passive sources of energy (e.g., solar energy) have been developed to produce the required heat for evaporation. One approach for a solar-powered distillation system to produce fresh water from seawater is disclosed in U.S. Pat. No. 8,613,840. The solar-powered distillation system includes a heat-absorbent evaporation panel having mutually opposed evaporation surfaces. The panel is contained within a housing. Each side of the housing includes a lens panel. The lenses of each panel focus solar energy onto the respective surfaces of the evaporation panel. A mirror is positioned to each side of the housing to reflect solar energy onto the respective lens panels. Contaminated water enters the top of the housing to run down the surfaces of the evaporation panel. A fresh water collection pipe extends from the top of the housing to a collection tank. A scraper mechanism removes salt and/or other residue from the surfaces of the evaporation panel to allow the residue to be removed periodically from the bottom of the housing.

Another approach for a solar-powered distillation system is provided by WaterFX. Solar troughs reflect sunlight to a pipe filled with a heat transfer fluid (HTF), such as mineral oil. The heated mineral oil powers a heat pump. The heat is fed to a multi-effect or multi-stage distillation system that evaporates freshwater from the seawater or contaminated water. The multi-effect approach to evaporating freshwater is efficient since each stage essentially reuses the energy from a previous stage. The steam that is produced condenses into pure liquid water, and the remaining salt solidifies and can be removed.

Even in view of the above solar distillation approaches there is still a need to improve upon such a system for processing seawater or other contaminated water that is not portable to provide fresh water.

SUMMARY OF THE INVENTION

A solar distillation system includes a plurality of solar panels configured to reflect sunlight, and a plurality of receivers adjacent the plurality of solar panels and configured to receive process water to be processed to purified process water. The plurality of receivers may comprise at least a first receiver and a last receiver, with the process water flowing from the first receiver to the last receiver and being heated by the reflected sunlight.

Vapor tubes may be coupled to the receivers, with each respective vapor tube being coupled between adjacent receivers. Water vapor is generated as the process water is heated within each receiver, with the water vapor flowing via the respective vapor tubes between the adjacent receivers towards the last receiver.

A return vapor tube may be coupled to the last receiver, and a distillation tube may be coupled to the return vapor tube to receive the water vapor. The distillation tube may extend through the plurality of receivers from the last receiver to the first receiver. As the water vapor travels through the distillation tube the water vapor changes to a liquid, with the liquid being the purified process water.

The plurality of receivers may be connected in series so that each receiver uses heat energy from a previous receiver to heat the process water, except for the first receiver. In other words, the process water may be heated in stages, with each receiver corresponding to a stage. A multi-stage or multi-effect approach to heating the process water is efficient since each stage essentially reuses the energy from a previous stage. As the process water is heated within each receiver, the water vapor is generated.

Each receiver may be filled by the process water except for an air gap so as to allow the water vapor to develop. The distillation tube may extend through each receiver below the air gap. The distillation tube may be in direct contact with the process water within each receiver, and as the water vapor changes to the liquid within the distillation tube heat is given off. The heat given off during this phase change may be provided to each stage, thus further increasing the efficiency of the solar distillation system. An output of the distillation tube provides the purified process water.

Each vapor tube may extend between the air gaps in adjacent receivers. Each receiver has a given volume, and the air gap may be about 10 to 20% of the given volume.

The plurality of solar panels may be configured as parabolic troughs, with the plurality of receivers being positioned within a focal point of the plurality of solar panels. Each receiver may have an I-shape or a double Y-shape.

The solar distillation system may further comprise a plurality of auxiliary heat sources adjacent the plurality of receivers. The solar distillation system may further comprise a vacuum coupled to the distillation tube to direct flow of the water vapor through the plurality of receivers and the distillation tube. The solar distillation system may further comprise a pump coupled to the first receiver to control a flow rate of the process water through the plurality of receivers.

The process water may comprise at least one of sea water, frac water and waste water. The last receiver may output the process water that does not turn to water vapor.

A method for processing process water to purified process water using a solar distillation system as described above is provided. The method comprises reflecting sunlight from the plurality of solar panels to the plurality of receivers, and providing the process water to the plurality of receivers. The process water flows from the first receiver to the last receiver and may be heated by the reflected sunlight. Water vapor may be generated within each receiver as the process water is heated, with the water vapor flowing via the respective vapor tubes between the adjacent receivers towards the last receiver. The method may further comprise providing the water vapor from the return vapor tube at the last receiver to the distillation tube, and as the water vapor travels through the distillation tube the water vapor changes to a liquid, with the liquid being the purified process water.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and double notations are used to indicate similar elements in alternative embodiments.

Figure 1:
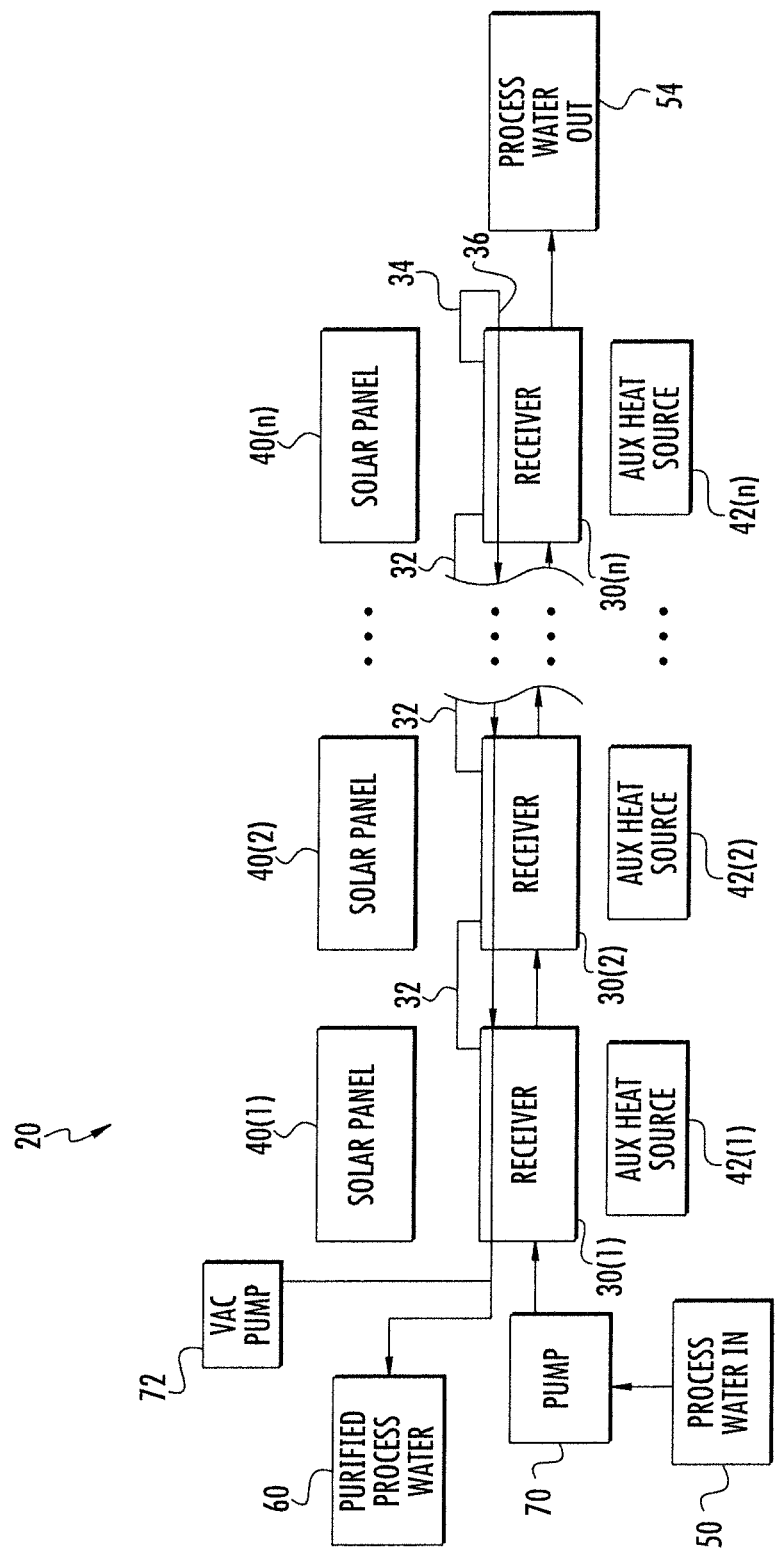
FIG. 1 is a block diagram of a multi-effect solar distillation system in accordance with the present invention.

Referring initially to FIG. 1, a multi-effect solar distillation system 20 includes a plurality of receivers 30(1)-30(n) and a plurality of solar panels 40(1)-40(n) adjacent the plurality of receivers. Each receiver is positioned within a focal point of a respective solar panel.

The water to be processed will be generally referred to as process water 50. The process water 50 may be sea water, oil field frac water or industrial waste water, for example. The process water 50 is heated as it flows through each of the receivers 30(1)-30(n). As the process water 50 is heated, water vapor is generated, which will eventually provide purified process water 60.

The process water 50 is heated in stages, with each receiver corresponding to a stage. A multi-stage or multi-effect approach to heating the process water 50 is efficient since each stage essentially reuses the energy from a previous stage. As the process water 50 is heated within each receiver, water vapor is generated.

In the illustrated embodiment, a small percentage of the process water 50 is turned to vapor as it travels through the receivers 30(1)-30(n). This percentage may be within a range of about 10-20%, for example. The last receiver 30(n) directs the remaining process water 54 to the sea if it is sea water, or to a holding tank for further processing if it is oil field frac water or industrial waste water.

Water vapor flows between adjacent receivers 30(1), 30(2) via a vapor tube 32 connected therebetween. At the last receiver 30(n), a return vapor tube 34 is connected to a distillation tube 36. The return vapor tube 34 directs the vapor to an input of the distillation tube 36. The distillation tube 36 extends through each of the receivers 30(1)-30(n) but is separate from the process water 52 circulating within each receiver.

As the water vapor travels through the distillation tube 36, it changes phases back to a liquid. The heat given off during this phase change is provided to each respective stage, thus further increasing the efficiency of the illustrated multi-effect solar distillation system 20. An output of the distillation tube 36 provides the purified process water 60.

Since the process water 50 flows through the receivers 30(1)-30(n) instead of a heat transfer fluid (HTF), the illustrated multi-effect solar distillation system 20 is also referred to as an "in-situ" multi-effect solar distillation system.

Figure 2:
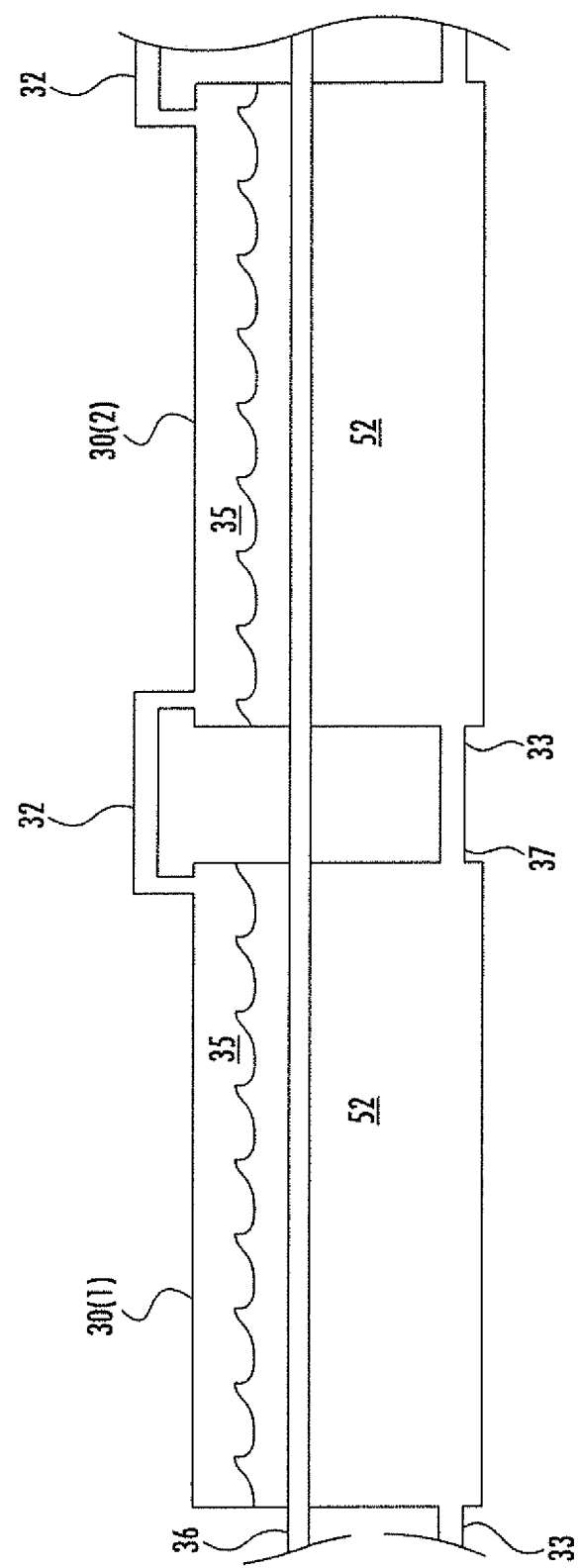
FIG. 2 is a detailed view of the first and second receivers illustrated in FIG. 1.

The process water 50 enters an input 33 of the first receiver 30(1) and fills the first receiver 30(1) except for an air gap 35 at the top so as to allow water vapor to develop, as illustrated in FIG. 2. The air gaps 35 may be about 10-20% of the volume of the receivers. The distillation tube 36 is positioned so that it is below the gap 35. As noted above, positioning the distillation tube 36 in contact with the process water 50 advantageously allows heat to be given off as the water vapor changes phases back to a liquid.

An output 37 of the first receiver 30(1) is connected to an input 33 of the second receiver 30(2). The process water 52 fills the second receiver 30(2) except for another air gap 35 at the top so as to allow water vapor to develop. This process continues for each of the receivers.

Figure 3:
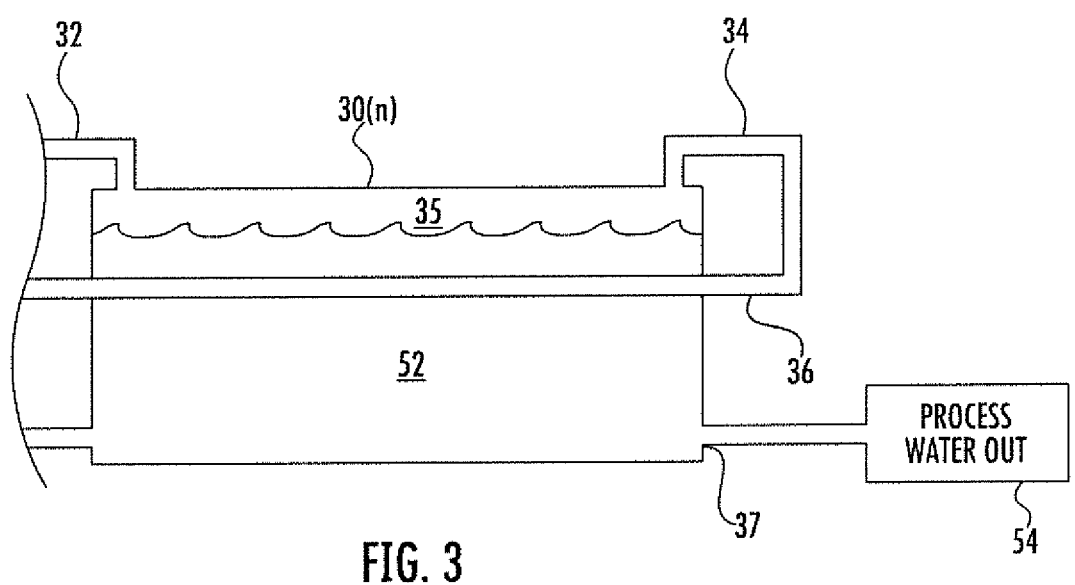
FIG. 3 is a detailed view of the last receiver illustrated in FIG. 1.

A vapor tube 32 couples together the air gaps 35 in any two adjacent receivers. In the illustrated example, a vapor tube 32 provides a passageway for the water vapor to travel from the air gap 35 in the first receiver 30(1) to the air gap 35 in the second receiver 30(2). This process continues for each of the receivers. At the last receiver 30(n), a return vapor tube 34 couples the air gap 35 therein to the distillation tube 36, as illustrated in FIG. 3.

As will now be discussed in greater detail, the multi-effect solar distillation system 20 includes multiple components for heating the process water 50 to the desired temperature. These components include a structure to preheat the process water, a parabolic trough for the capture of solar thermal energy, a circulation pump, a receiver with a large solar impingement area and a low interior volume, and a distillation tube.

To further improve heating of the process water 50, the multi-effect solar distillation system 20 may include a vacuum pump or system 72 coupled to the distillation tube to help lower the boiling temperature of the process water 50 as well as provide direction to the flow of the water vapor. In addition, a plurality of auxiliary heat sources 42(1)-42(n) may be positioned adjacent the plurality of receivers 30(1)-30(n) to allow for low or no sun operation. The auxiliary heat sources 42(1)-42(n) may be gas burners, for example.

Preheat can be accomplished by storing the process water 50 in a lined pond or tank with a large surface exposure area that is covered by a greenhouse style building. The building has sides and a roof made from a clear material that will let the ambient solar energy in and warm the stored process water 50. The roof of the building may be shaped so as to channel any water vapor that will condense into a collector as this will be purified process water. The building may be constructed so that minimal heat and water vapor will be lost to the outside environment so as to increase efficiency.

Figure 4:
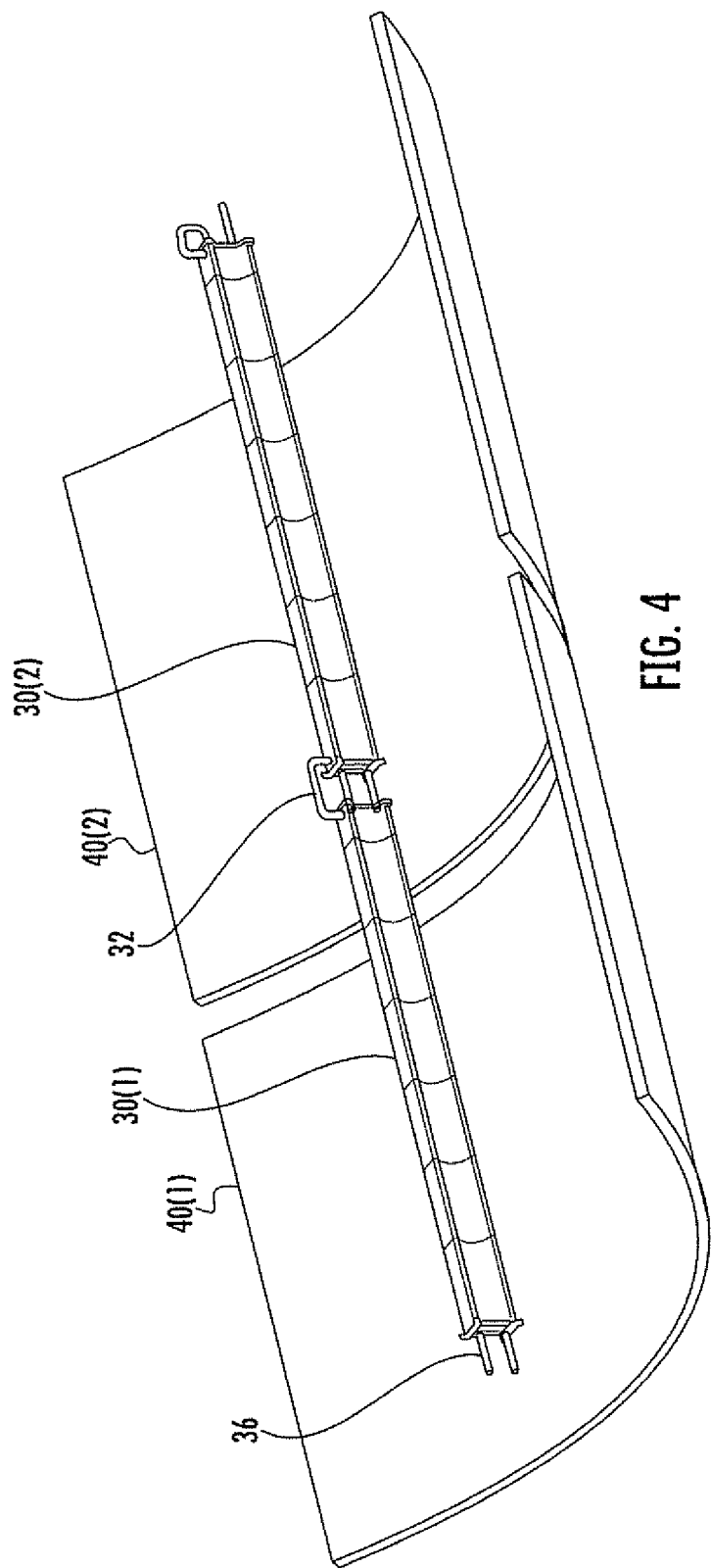
FIG. 4 is a perspective view of one embodiment of the receivers and solar panels illustrated in FIG. 1.

The solar panels 40(1)-40(n) may be configured as large aperture parabolic troughs, as illustrated in FIG. 4. Each parabolic trough includes a reflective material for directing the sunlight to a focal point. The reflective material may be glass mirrors or thin reflective film, for example. The parabolic troughs may be placed in series to allow for the heating of the process water 50 to a proper temperature.

A pump 70 moves the process water through the receivers 30(1)-30(n), as illustrated in FIG. 1. The pump 70 includes controls to vary the flow rate of the process water 50. Control of the flow rate controls a rate of evaporation of the process water 50. The flow rate of the process water 50 through the receivers 30(1)-30(n) may be within a range of about 5-15 gallons per minutes, for example. As readily appreciated by those skilled in the art, the flow rate is selected so that a desired percentage of the process water vaporizes as it travels through the receivers 30(1)-30(n). As the flow rate is increased, then the number of receiver stages would also need to be increased to obtain the desired temperate to vaporize the process water 50. The flow rate is inversely proportional to the energy absorbed by the receivers 30(1)-30(n).

The receivers 30(1)-30(n) are configured to provide a large solar impingement area, yet have a low interior volume. The receivers 30(1)-30(n) are located within the parabolic trough 40(1)-40(n) so that the solar energy is reflected thereon from both upper and lower halves of the parabolic trough. The receivers 30(1)-30(n) are mounted so that they may be adjusted to aid in an optimum position to receive the solar energy.

Figure 5:
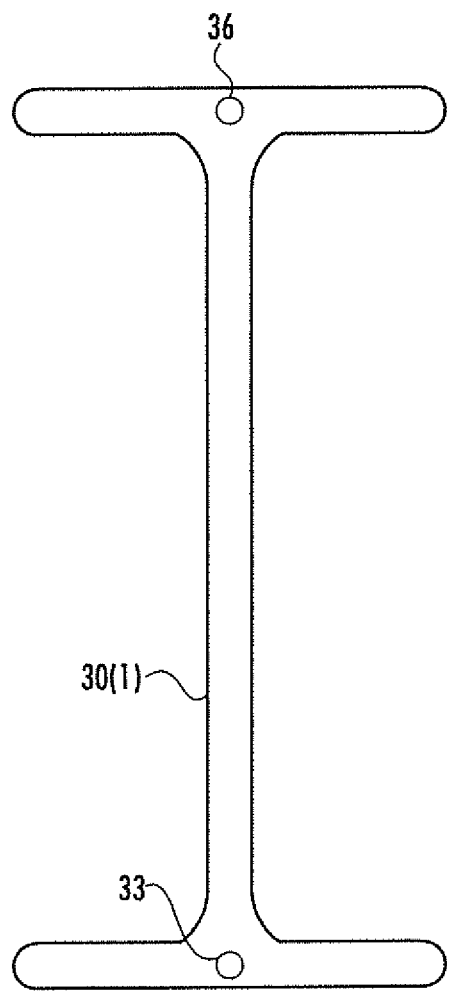
FIG. 5 is a side view of one embodiment of the receiver illustrated in FIG. 1 having an I-shape.

A fill port or input 33 and an exit port of output 37 at a bottom of each receiver allows for the process water 50 to enter and exit. The receiver is not limited to any particular design. One example design of a receiver 30(1) is an I-shape, as illustrated in FIG. 5. The I-shaped receiver 30(1) is sized according to the corresponding parabolic trough 40(1). Example dimensions are 6 inch top and bottom sections centered perpendicular to a 12 inch vertical section. This structure is hollow on the inside to allow for the process water to be directed down the length of the receiver.

Several inches down from the top of the vertical sides would flare away from each other to increase the overall width to allow for the placement of the distillation or condensate tube 36. The I-shaped receiver 30(1) is sealed to collect the water vapor being created by the heating of the process water. The water level is controlled so that there will be a gap or void 35 at the top of the I-shaped receiver 30(1) to allow for the collection of the water vapor. An opening at the top of the receiver 30(1) directs the clean water vapor to a vapor tube 32 coupled to an adjacent receiver. The 6 inch wide top and bottom section of the receiver 30(1) provides an additional area to capture solar energy. All dimensions are approximate and may be changed to ensure optimum solar impingement along the receiver 30(1).

Figure 6:
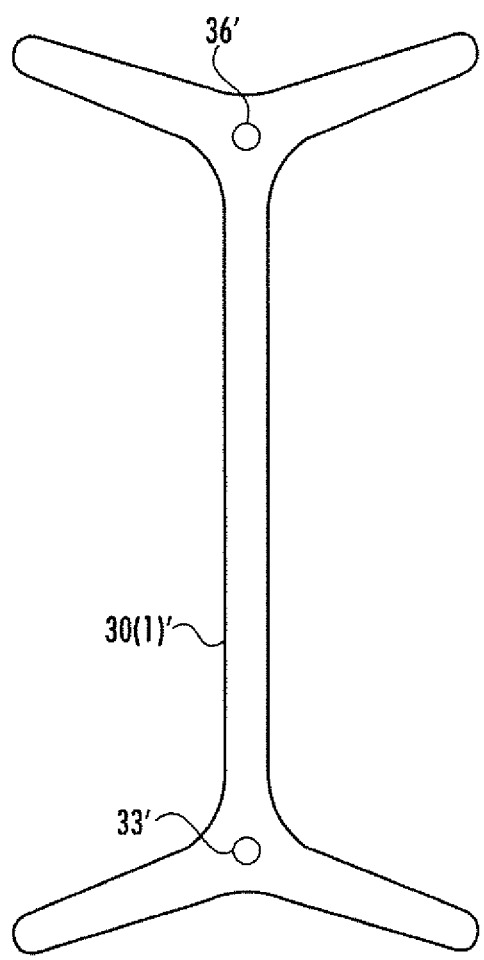
FIG. 6 is a side view of another embodiment of the receiver illustrated in FIG. 1 having a Y-shape.
Figure 7:
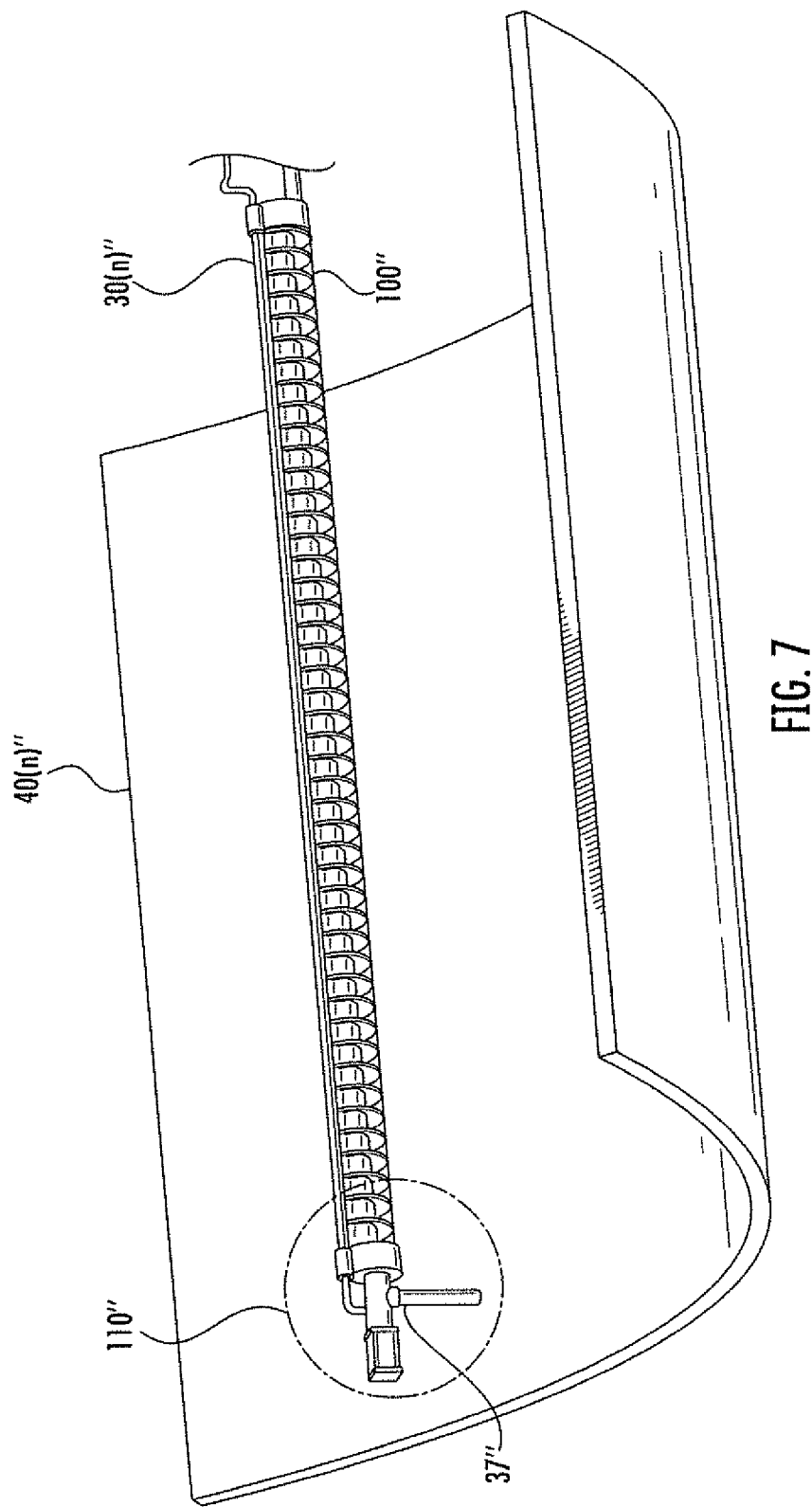
FIG. 7 is an exposed perspective view of another embodiment of the last receiver illustrated in FIG. 1 with an auger included therein.
Figure 8:
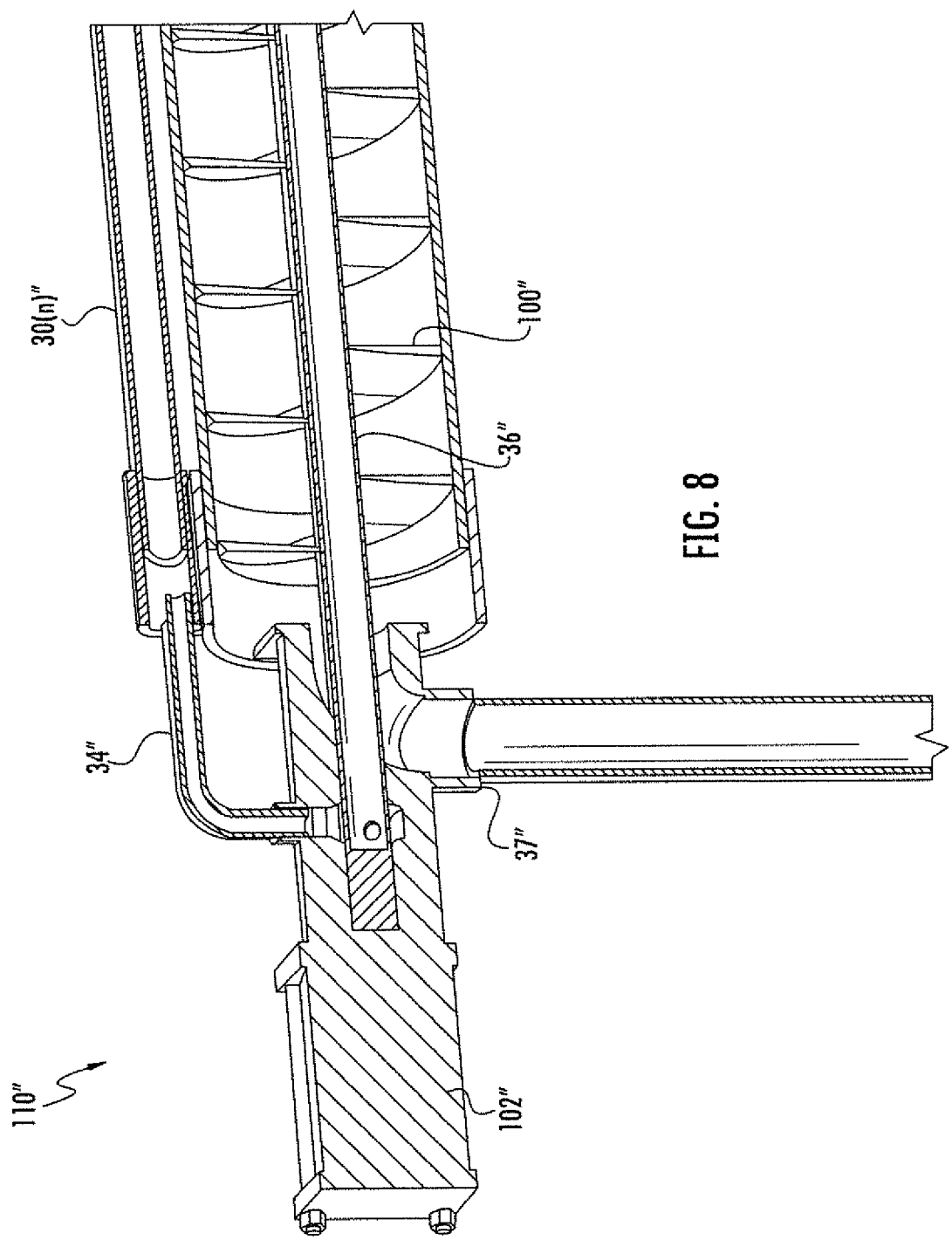
FIG. 8 is an enlarged cross-sectional view of section 110" highlighted in FIG. 7.
Figure 9:
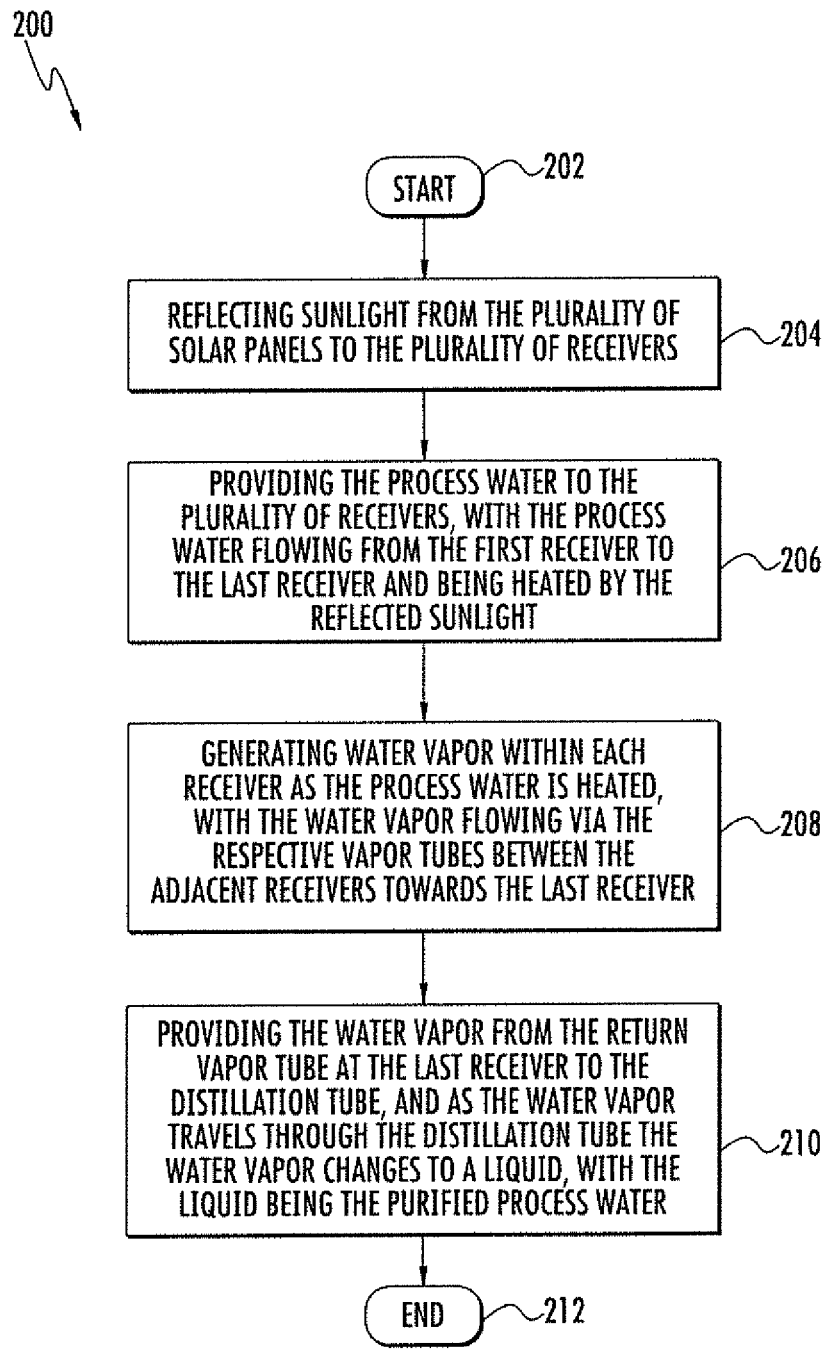
FIG. 9 is a flowchart illustrating a method for processing process water to purified process water using a solar distillation system as illustrated in FIG. 1.

Another example design of a receiver is a double Y-shaped receiver 30(1)', as illustrated in FIG. 6. The dimensions will be approximately 5.6×13 inches. This hollow double Y-shaped receiver 30(1)' features a thin vertical chamber section with a Y-shaped section attached at both the top and bottom of the vertical section. Like the I-shaped receiver, the double Y-shaped receiver 30(1)' is sealed to capture the water vapor upon heating and likewise features a condensate tube 36' placed inside. An opening at the top of the receiver 30(1)' directs the clean water vapor to a vapor tube coupled to an adjacent receiver.

As noted above, the distillation tube 36 extends through each of the receivers 30(1)-30(n) but is separate from the process water 52 circulating within each receiver. The distillation tube 36 thus provides the outlet for the water vapor to escape the distillation chamber of the receiver. This tube could be directed to a heat exchanger where the incoming process water will pass over the tube to cool the vapor so that water is formed and then collected into a purified water storage tank or pond. The distilled vapor in the condensate tube never intermingles with the process water.

The condensate tube runs "counter current" to the flow within the receiver. The condensate tube is formed within the receiver so that the flow of the steam is in an opposite direction to the process water. This allows the water vapor to release its heat into the flow of the process water to advantageously increase the efficiency of the cycle as the heat contained in the water vapor is returned into the cycle.

As noted above, the vacuum pump or system 72 may be used to lower the temperature at which water turns from a liquid into a vapor. A vacuum may also be applied to the port where the water vapor exits the receiver. The vacuum can be applied separately to each receiver or daisy chained in series. At the end of the vacuum line and before entering the vacuum pump 72, the condensate will enter a separator to remove the distilled water from the air column.

As also noted above, a plurality of auxiliary heat sources 42(1)-42(n) may be positioned underneath the plurality of receivers 30(1)-30(n) to allow for low or no sun operation. The auxiliary heat sources 42(1)-42(n) may be gas burners, for example, and when ignited, provides a heat source on the receivers 30(1)-30(n) for the distillation process when solar conditions are not sufficient for the process to occur.

The pump 70 moves the process water throughout the receivers 30(1)-30(n). The pump 70 includes controls to vary the flow rate of the process water 50. The flow of the process water may be slowed so that a much larger percentage of the process water is vaporized. As a result, salt or containments remaining from the evaporated process water accumulates to form a sludge in the last receiver 30(n)". To force the sludge out of the last receiver 30(n)", an auger 100" is included therein. The auger 100" forces the accumulated sludge out an exit port. The condensate tube 36" runs through the center of the auger 100". A motor 102" coupled to the last receiver 30(n)" drives the auger 100".

To further increase the efficiency of collecting and directing solar energy to the receivers 30(1)-30(n), each solar panel 40(1) may comprise a plurality of tunable solar collector panels carried by a base. Each solar collector panel may be tuned or biased in terms of position so that the sun's radiation as reflected from each solar collector panel is more accurately aligned on the focal line where the receiver 30(1) is positioned so as to maximize the amount of energy received.

Collectively the solar collector panels may have a parabolic shape, and are separate from one another. Coupled to the solar collector panels are panel positioning devices. The panel positioning devices move the solar collector panels based on optical sensor devices that are used to determine alignment of the respective focal lines where the receivers are positioned so as to maximize the amount of energy received.

Yet another feature of the above-described receivers 30(1)-30(n) is to position the metal receivers within glass tube sections. The glass tube sections prevent heat from the metal receivers from escaping. Each glass tube section interfaces with an adjacent glass tube section via an expansion baffle. Metal seals at the ends of the glass tube sections are coupled to the expansion baffle. The expansion baffle allows for expansion and contraction of the metal seals so as to avoid breakage to the glass tube sections. A vacuum may also be pulled through the glass tube sections.

Even though process water 50 is flowing through the receivers 30(1)-30(n), a heat transfer fluid (HTF) may be flowed instead. The heated HTF would then power a heat pump. The heat may then be fed to a multi-effect or multi-stage distillation system that evaporates the freshwater from the seawater or contaminated water.

As an alternative to the condensate tube running "counter current" to the flow within the receivers, the condensate tube may run "co-current" to the flow within the receivers. The purified process water would exit the last receiver along with the process water out.

Another aspect is directed to a method for processing process water 50 to purified process water 60 using the solar distillation system 20. From the start (Block 202), the method comprises reflecting sunlight from the plurality of solar panels 40(1)-40(n) to the plurality of receivers 30(1)-30(n) at Block 204. The process water 50 is provided to the plurality of receivers 30(1)-30(n) at Block 206, with the process water flowing from the first receiver 30(1) to the last receiver 30(n) and being heated by the reflected sunlight. Water vapor is generated at Block 208 within each receiver as the process water 50 is heated. The water vapor flows via the respective vapor tubes 32 between the adjacent receivers towards the last receiver 30(n). The water vapor is provided from the return vapor tube 34 at the last receiver 30(n) to the distillation tube 36 at Block 210. As the water vapor travels through the distillation tube 36 the water vapor changes to a liquid, with the liquid being the purified process water 60. The method ends at Block 212.

Figure 10:
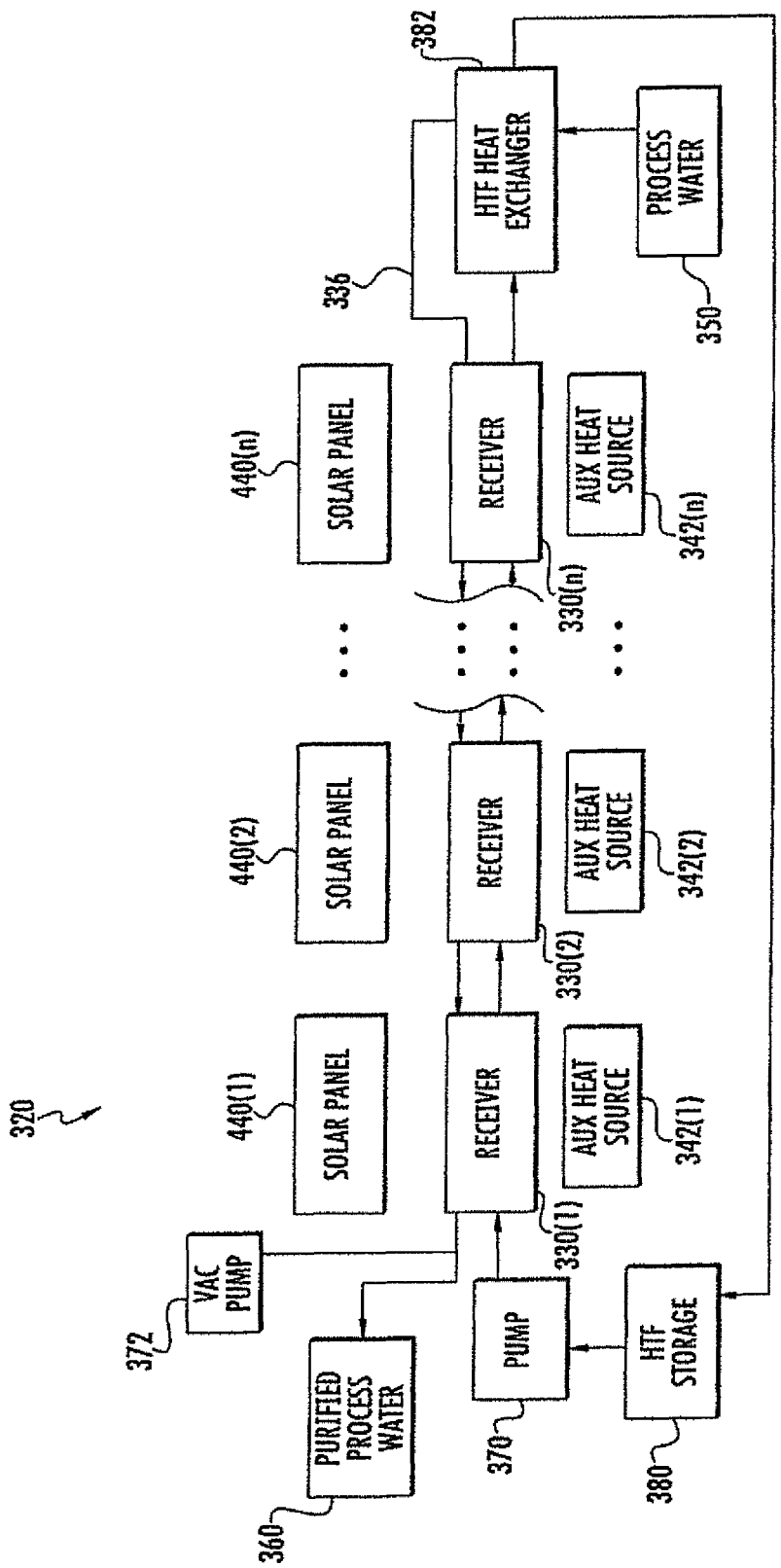
FIG. 10 is a block diagram of another embodiment of a multi-effect solar distillation system in accordance with the present invention.

Another embodiment of a multi-effect solar distillation system 300 using a heat transfer fluid (HTF) will now be discussed in reference to FIG. 10. The illustrated multi-effect solar distillation system 320 includes a plurality of receivers 330(1)-330(n) and a plurality of solar panels 440(1)-440(n) adjacent the plurality of receivers. Each receiver is positioned within a focal point of a respective solar panel. Instead of heating the process water within the receivers 330(1)-330(n) as with the above embodiment, a heat transfer fluid (HTF) is heated. The HTF may be mineral oil or glycol, for example.

An HTF storage 380 provides the HTF that flows through the receivers 330(1)-330(n) to be heated. A pump 370 moves the HTF through the receivers 30(1)-30(n), and includes controls to vary the flow rate of the HTF.

The HTF is heated as it flows through each of the receivers 330(1)-330(n). As with the process water 50 above, the HTF is heated in stages, with each receiver corresponding to a stage. A multi-stage or multi-effect approach to heating the HTF is efficient since each stage essentially reuses the energy from a previous stage.

At the last receiver 330(n), the heated HTF is provided to a heat exchanger 382. The process water 350 is also provided to the heat exchanger 382 for conversion to steam. The heat exchanger 382 may be a flash heat exchanger, for example, where the heated HTF is routed through a grid. The process water 350 is then splashed or sprayed onto the grid, which then turns to water vapor and/or steam. This type of heat exchanger 382 is also known as a flash exchanger, as readily appreciated by those skilled in the art. The process water 350 does not come in contact with the HTF.

The steam generated by the HTF heat exchanger 382 is directed to the distillation tube 336. The distillation tube 336 extends through each of the receivers 330(1)-330(n) but is separate from the HTF circulating within each receiver. The HTF provided at the output of the heat exchanger 382 is recirculated back to the HTF storage 380.

As the steam travels through the distillation tube 336, it changes phases back to a liquid. The heat given off during this phase change is provided to each respective stage, thus further increasing the efficiency of the illustrated multi-effect solar distillation system 320. An output of the distillation tube 336 provides the purified process water 360.

The distillation tube 336 is in contact with the HTF circulating within each receiver. The HTF advantageously allows heat to be given off as the water vapor changes phases back to a liquid.

The multi-effect solar distillation system 320 may include a vacuum pump or system 372 coupled to the distillation tube 336 to provide direction to the flow of the water vapor. In addition, a plurality of auxiliary heat sources 342(1)-342(n) may be positioned adjacent the plurality of receivers 330(1)-330(n) to allow for low or no sun operation. The auxiliary heat sources 342(1)-342(n) may be gas burners, for example.

The distillation (i.e., condensation) tube 336 runs "counter current" to the flow within the receiver. The condensate tube is formed within the receiver so that the flow of the steam is in an opposite direction to the HTF. This allows the water vapor to release its heat into the flow of the HTF to advantageously increase the efficiency of the cycle as the heat contained in the water vapor is returned into the cycle.

The auxiliary heat sources 342(1)-342(n) may be gas burners, for example, and when ignited, provides a heat source on the receivers 330(1)-330(n) for the distillation process when solar conditions are not sufficient for the process to occur.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed:
1. A solar distillation system comprising:
   a plurality of solar panels configured to reflect sunlight;
   a plurality of receivers adjacent said plurality of solar panels and configured to receive process water to be processed to purified process water, said plurality of receivers connected in series and comprising at least a first receiver and a last receiver;

each receiver having spaced apart opposing end surfaces including a process water input on one of the opposing ends and a process water output on the other opposing end, and with the process water flowing from said first receiver to said last receiver via the respective process water inputs and outputs such that each receiver receives the process water from a previous receiver except for the first receiver, with the process water being heated by the reflected sunlight, and with excess process water exiting the process water output on said last receiver;

a plurality of vapor tubes coupled to said plurality of receivers, with each respective vapor tube coupled between adjacent receivers, and water vapor is generated as the process water is heated within each receiver, with the water vapor flowing via said respective vapor tubes between the adjacent receivers towards said last receiver;

a return vapor tube coupled to said last receiver; and a distillation tube coupled to said return vapor tube to receive the water vapor, with said distillation tube extending through said plurality of receivers from said last receiver to said first receiver, and as the water vapor travels through said distillation tube the water vapor changes to a liquid, with the liquid being the purified process water.

2. The solar distillation system according to claim 1 wherein each receiver uses heat energy from a previous receiver to heat the process water, except for said first receiver.

3. The solar distillation system according to claim 1 wherein each receiver is filled by the process water except for an air gap so as to allow the water vapor to develop.

4. The solar distillation system according to claim 3 wherein said distillation tube extends through each receiver below the air gap.

5. The solar distillation system according to claim 4 wherein said distillation tube is in direct contact with the process water within each receiver, and as the water vapor changes to the liquid within said distillation tube heat is given off.

6. The solar distillation system according to claim 3 wherein each vapor tube extends between the air gaps in adjacent receivers.

7. The solar distillation system according to claim 3 wherein each receiver has a given volume, and the air gap is about 10 to 20% of the given volume.

8. The solar distillation system according to claim 1 wherein said plurality of solar panels are configured as parabolic troughs, with said plurality of receivers being positioned within a focal point of said plurality of solar panels.

9. The solar distillation system according to claim 8 wherein each receiver has at least one of an I-shape and a double Y-shape.

10. The solar distillation system according to claim 1 further comprising a plurality of auxiliary heat sources adjacent said plurality of receivers.

11. The solar distillation system according to claim 1 further comprising a vacuum coupled to said distillation tube to direct flow of the water vapor through said plurality of receivers and said distillation tube.

12. The solar distillation system according to claim 1 further comprising a pump coupled to said first receiver to control a flow rate of the process water through said plurality of receivers.

13. The solar distillation system according to claim 1 wherein the process water comprises at least one of sea water, frac water and waste water.

14. The solar distillation system according to claim 1 wherein said last receiver outputs the process water that does not turn to water vapor.

* * * * *